No. 780,381. PATENTED JAN. 17, 1905.
D. A. REAVILL.
PANORAMIC CAMERA.
APPLICATION FILED MAY 25, 1904.
2 SHEETS—SHEET 2.
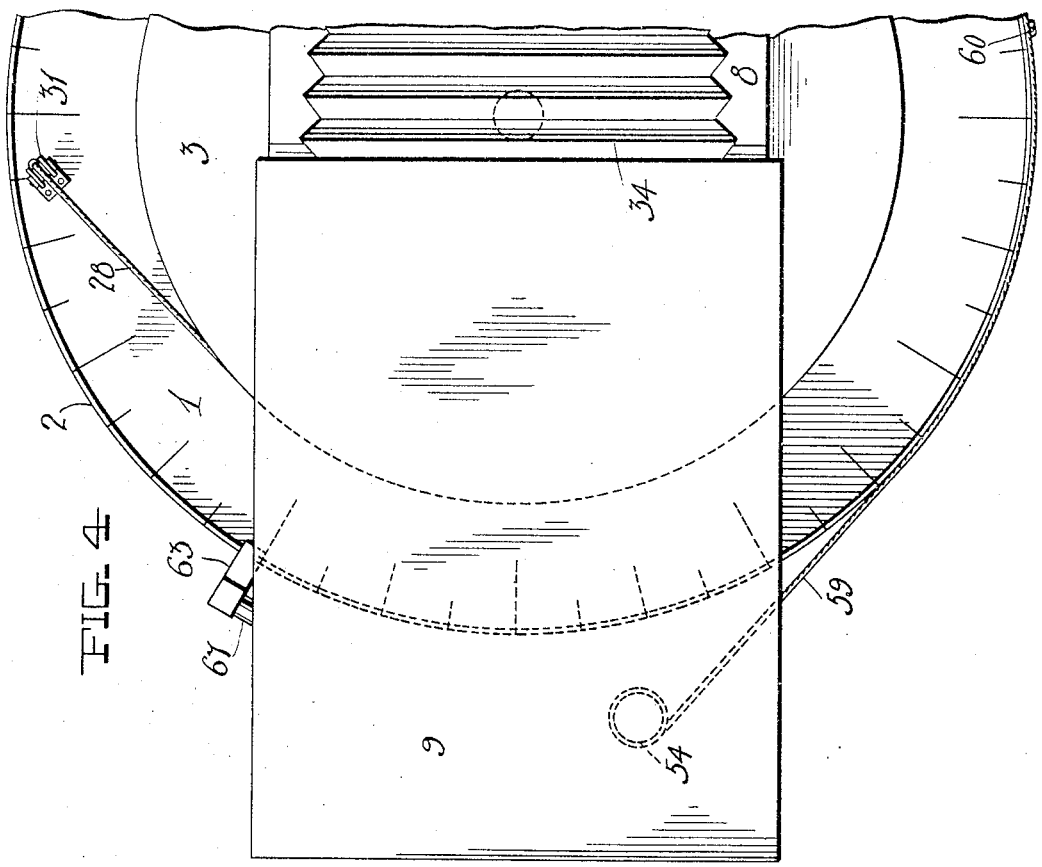
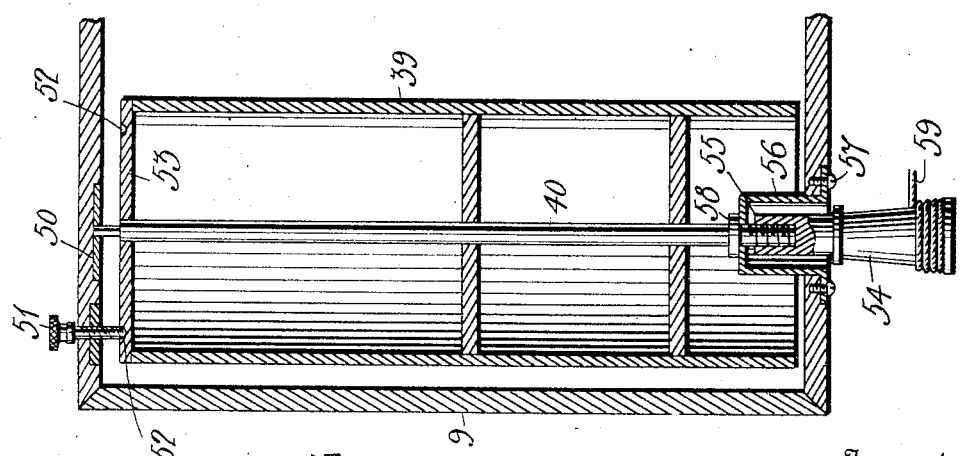
Witnesses
Inventor
David A. Reavill
By Edwin Guthrie
Attorney No. 780,381.                                                      Patented January 17, 1905.

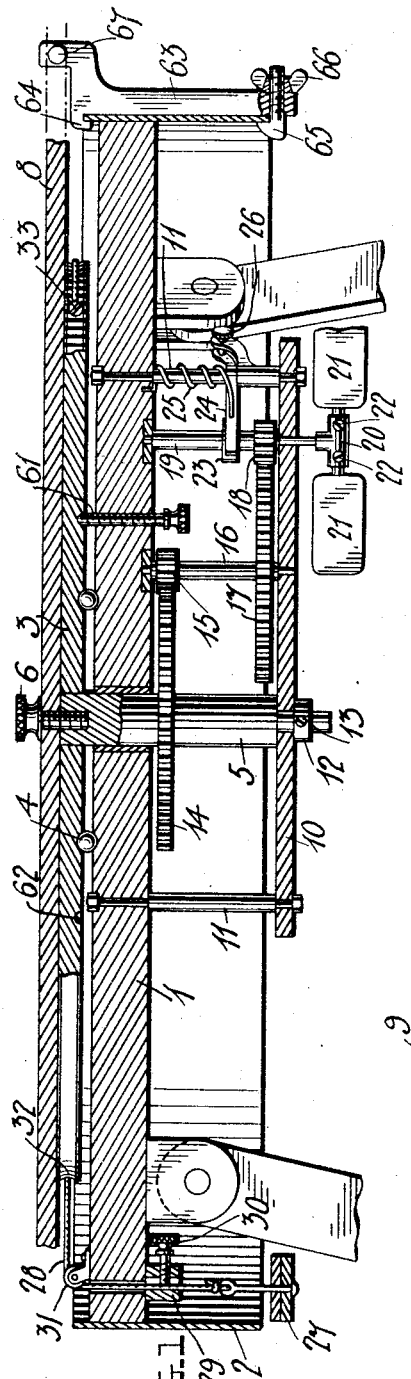

UNITED STATES PATENT OFFICE.

DAVID A. REAVILL, OF ROCK SPRINGS, WYOMING, ASSIGNOR TO THE ROCHESTER PANORAMIC CAMERA COMPANY, A CORPORATION OF WYOMING.

PANORAMIC CAMERA.

SPECIFICATION forming part of Letters Patent No. 780,381, dated January 17, 1905.

Application filed May 25, 1904. Serial No. 209,677.

*To all whom it may concern:*

Be it known that I, DAVID A. REAVILL, a citizen of the United States, residing at Rock Springs, in the county of Sweetwater and State of Wyoming, have invented certain new and useful Improvements in Panoramic Cameras, of which the following is a specification.

My invention relates to panoramic cameras—that is to say, it belongs to the class of photographic cameras which are revoluble upon a tripod or other support and are swung around by suitable mechanism in a horizontal circle or portion of a circle, thus bringing all objects at every point of the compass within range of the lens, enabling such objects to be photographically taken upon a sensitive film properly exposed and moved within the camera-box.

The object of my invention is to produce a camera of character stated having devices of special construction and arrangement by which the camera-box is revolved with greater or less speed, as desired, and the film given an appropriately corresponding movement.

I accomplish the object sought by fashioning and associating coöperating parts as illustrated in the accompanying drawings, of which—

Figure 1 is a side view, partly in vertical section, of the bottom of the camera-box, the top of the tripod, the means for revolving the turn-table, and the speed-regulating devices. Fig. 2 represents a top view of the invention, the rear portion of the camera-box being in horizontal section, thereby exhibiting the tops of the film-roll and feed-roll and the walls of their respective chambers and showing the exposure-slot which the film passes. Fig. 3 is a fragmentary vertical sectional view of the rear part of the camera-box, showing the feed-roll, the manner in which it is removably and rotatively mounted, and one method of locking it against rotation or displacement. In this figure is also represented the spool and the manner of attaching it at the lower end of the feed-roll axis. Fig. 4 is a top view of the camera-box and shows also portions of the top of the tripod and the turn-table of the weight-motor, which are not covered by the box. For purposes of illustration in this view the position of the camera-box with respect to the turn-table has been changed from that which it occupies in Fig. 1 in order that the cord and pulley of the weight-motor and the cord from the feed-roll spool may both be illustrated.

Like numbers refer to like parts throughout.

Considering Fig. 1 of the drawings, numeral 1 designates the top of a tripod of any chosen size. In my invention it is a circular disk ordinarily provided with a depending apron or flange 2, which will be again mentioned. Immediately above top 1, concentrically placed, is a turn-table 3, and the balls 4 or other antifriction devices are interposed between the top and turn-table. Passing movably through the top 1 and engaging a central orifice in the turn-table is the main arbor or axis 5. At the upper end the arbor is tapped for thumb-screw 6, which passes through slot 7 in the hinged front wall 8 of camera-box 9, (see also Fig. 2,) thereby securing the box removably and adjustably upon the turn-table. By means of these adjusting devices the camera may be placed in the position shown and described for Fig. 4 or in other positions with relation to its supports. The lower end of arbor 5 is journaled in a plate 10, suspended from the top of the tripod by the studs 11. Below the plate 10 the journal of arbor 5 is provided with the collar 12 and set-screw 13. Upon arbor 5 is mounted the gear-wheel 14, that meshes with pinion 15 on vertical shaft 16, suitably journaled in plate 10 and the tripod-top. On shaft 16 is a gear-wheel 17, that meshes with the pinion 18 on vertical shaft 19, pivotally supported by plate 10 and top 1. Shaft 19 passes downwardly through plate 10 and carries at its lower end the hub 20, in which fan-blades 21 are adjustably secured by screws 22, as drawn, or in like manner. Shaft 19 also carries the brake-wheel 23, against which the brake 24 is normally pressed by the coil-spring 25, encircling the stud 11. A set-screw 26 relieves the pressure of the brake when it is desired that the fan shall revolve.

The motor mechanism consists of the variable weight 27 below the tripod-top, attached to cord or other flexible connection 28, passing upwardly through a clamping device, which may consist of the bored block 29, through which the cord passes, and the thumb-screw 30, arranged to press upon and hold the cord, as shown. Cord 28 continues through a suitable orifice in the tripod-top, thence over a pulley 31, (see also Fig. 4,) and around the turn-table, which usually possesses a groove 32 to receive it and in which one end is secured by a screw or pin 33 or in like manner. The cord 28 and weight 27 are removable. Here it may be stated that I do not confine myself to the weight-motor shown and described or to any form of weight-motor. In this class of cameras spring-motors are common, and it would require no change in the construction herein set forth to apply a spring-motor to the arbor 5. Indeed in practice I occasionally provide a spring-motor on an extra arbor, which may be substituted for arbor 5, shown, enabling either motor means to be employed at will.

Considering Fig. 2, number 34 marks the bellows of any form and extent, and in this figure also appears the longitudinal slot 7 and thumb-screw 6, by which the camera-box may be adjusted circularly or in the direction of its length, both in a horizontal plane, the latter adjustment permitting the camera-box to be accurately balanced upon the turn-table in order that its movement may proceed without tremor or the necessity for excessive power to revolve it.

In Fig. 2 is shown the film-roll 35, having the vertical axis 36, and a spring 37 normally presses against the roll or axis in order that the film shall not be unrolled unless drawn upon by the motor devices. The film-roll is inclosed in its own dark chamber, provided by the inclosing walls 38, making a rectangular compartment in one corner of the rear of the camera-box. Similarly, the feed-roll 39, having the axis 40, is provided with its own dark chamber by the erection of walls 41. Between the parallel portions of walls 38 and 41 is the exposure-slot of desired width, and at the rear those walls have divergent parts 42 and 43, supplied with cylindrical posts 44 along their edges to guide the film 45, which is shown passing across the divergent opening between the walls against the back of the camera-box. The divergent opening effects the vignetting or blending of the images in proper relation upon the film and is found to be an advantageous form for the exposure-slot near the film. I do not confine myself to any particular means for guiding the film and may wrap posts 44 at one or both edges with strips of soft dark material 46, such as is shown at the edge of the divergent wall 42, to avoid scratching the film and to exclude light.

In Fig. 2 number 47 designates a spring-pin, normally retracted, as shown, but which may be pressed inwardly to puncture the film at any desired point to mark the limit of exposure and indicate where the film is to be cut to separate one negative from that succeeding. It will be noted that a recess 48 is formed in the exterior of the back of the box, and the head of the pin enters this recess. The flexible leather covering 49, part of which is shown, lies over the recess and excludes the light.

Considering Fig. 3, it will be observed that the axis 40 of the feed-roll is pivotally held by plate 50 at the top, and at one side is placed the thumb-screw 51, that passes through the top of the box and enters one of a number of holes 52 in plate 53 on the top of the feed-roll. When the thumb-screw engages a hole, the roll is effectively locked against rotation, and the removable spool 54 may be screwed on or off the lower end of axis 40 without turning the roll and disturbing the film. As illustrated, the threaded end 55 of the spool projects within the box. It is surrounded by the thimble 56, removably attached to the bottom of the box by screws 57. Axis 40 passes through the top of the thimble, and a collar 58 on the axis rests upon the top of the thimble within the box and supports the weight of the roll and also excludes the light. Should it be desired to remove the feed-roll, the spool is taken off and the thimble removed. This allows the roll to drop down upon the bottom of the box, freeing the upper end of its axis from plate 50 and permitting it to be withdrawn through any door in the back of the box. (Not shown and not a part of my invention.) A cord 59 or other flexible connection is attached to and wound about the spool and also attached to flange 2 of the tripod-top by screw or pin 60. (See also Fig. 4.)

In the operation if the camera-box be swung around by the motor the cord 59 will be uncoiled from the spool and wrapped about the flange 2. At the same time the spool, and therefore the feed-roll, will be rotated, transferring the film past the exposure-slot from film-roll to feed-roll in the usual way. As the length of film exposed must be in cameras of this sort during one revolution equal to the circumference of a circle having the focal distance of the lens as a radius, it is clear that if the lens be changed another spool having proper diametric ratio to the top 2 must be used. It is customary to provide a number of spools, and they may be given a slight taper in order that the feed-roll will be moved more rapidly as the first layer of film is wound upon it and less rapidly as superimposed layers of film render it larger, thereby moving the film itself at approximately constant speed.

In Fig. 1 will be noted the screw 61, passing upwardly through the tripod-top and engaging one of a series of holes 62 in the under surface of the turn-table. The office of the screw is to prevent the turn-table from rotating when the tripod is carried from place to place.

It is frequently desirable that the lens should sweep a certain part of the circle and go no further. I provide, therefore, the camera-box stop 63, which possesses an overhanging lip 64, formed to engage the top edge of flange 2, and the stop also has an L-bolt 65 and thumb-screw 66, as illustrated, for clamping the stop at any one of the divisions marked upon the tripod-top and flange and shown in Fig. 4. Ordinarily I place an inelastic leather buffer 67 upon the raised part of stop 63 to bring the camera to rest without rebounding.

Having thus described my invention and the manner of its operation, what I claim is—

1. In a panoramic camera, the combination with a circular tripod-top, of a revoluble camera-box, a motor borne by the said top and arranged to revolve the camera-box, a feed-roll having an axis and a spool attached to the axis, and a flexible connection wound upon said spool and attached to said circular top whereby the revolution of the camera-box rotates the feed-roll and winds said connection about said circular top.

2. In a panoramic camera, the combination with a tripod having a circular top, of a revoluble camera-box, removable motor mechanism borne by the tripod for revolving the camera-box, a feed-roll having an axis and a spool attached to the axis, a flexible connection wound upon said spool and attached to said tripod-top whereby the revolution of the camera-box rotates the feed-roll and winds said flexible connection about said tripod-top.

3. In a panoramic camera, the combination with a circular tripod-top, of a turn-table, a motor borne by the said top and arranged to revolve the said turn-table, a camera-box attached to the turn-table, a feed-roll having an axis and a spool attached to the axis, and a flexible connection wound upon said spool and attached to the said circular top whereby the revolution of said turn-table and camera-box rotates the feed-roll and winds said connection about said circular top.

4. In a panoramic camera, the combination with a circular tripod-top, of a turn-table, a motor borne by the said top and arranged to revolve the said turn-table, a camera-box, clamping devices for attaching said box removably and adjustably to the turn-table, a feed-roll having an axis and a spool attached to the axis, and a flexible connection wound upon said spool and attached to the said circular top whereby the revolution of said turn-table and camera-box rotates the feed-roll and winds said connection about said circular top.

5. In a panoramic camera, the combination with a circular tripod-top, of a circular turn-table, a weight-motor arranged to act directly upon the turn-table, a camera-box attached to the turn-table, a feed-roll having an axis and a spool attached to the axis, and a flexible connection normally wound upon the spool and attached to the said tripod-top whereby the rotation of the camera rotates the feed-roll and winds the connection upon the said tripod-top.

6. In a panoramic camera, the combination with a circular tripod-top, of a circular turn-table, a weight-motor arranged to operate the turn-table, speed-regulating devices adapted to control the said motor, a camera-box attached to the said turn-table, a feed-roll having an axis and a spool attached to the axis, and a flexible connection normally wound upon the said spool and attached to said tripod-top whereby the revolution of the turn-table and camera rotates the feed-roll and winds the connection upon the said tripod-top.

7. In a panoramic camera, the combination with a support, of a revoluble camera-box, weight-operated motor means adapted to revolve the camera-box, locking devices by which the weight actuating said motor can be secured against gravity, a feed-roll, and means whereby the revolution of the camera-box rotates the feed-roll.

In testimony whereof I affix my signature in presence of two witnesses.

DAVID A. REAVILL.

Witnesses:
GEORGE J. JOHNSTON,
J. G. SCHOFIELD.